United States Patent

Frommelt et al.

[15] 3,653,173

[45] Apr. 4, 1972

[54] LOADING DOCK SHELTERS

[72] Inventors: Cyril P. Frommelt, and Sylvan J. Frommelt, both of Dubuque, Iowa

[73] Assignee: Dubuque Awning & Tent Company, Dubuque, Iowa

[22] Filed: Dec. 3, 1969

[21] Appl. No.: 881,703

[52] U.S. Cl. ..........................52/173, 52/204, 135/5
[51] Int. Cl. ....................................E04b 1/343, E06b 1/04
[58] Field of Search ..............52/173, 204; 135/5 R, 5 A; 49/475

[56] References Cited

UNITED STATES PATENTS

| 3,322,132 | 5/1967 | Rieder | 135/5 A |
| 3,403,489 | 10/1968 | Frommelt et al. | 52/204 |
| 3,461,627 | 8/1969 | Conger | 52/204 |

*Primary Examiner*—Alfred C. Perham
*Attorney*—Johnston, Root, O'Keeffe, Keil, Thompson & Shurtleff

[57] ABSTRACT

A loading dock shelter embodying side panels normally disposed in outwardly spaced, substantially parallel relation to a wall, with a resilient member extending between the upper portions of the panels for yieldingly holding them in such normal position.

7 Claims, 5 Drawing Figures

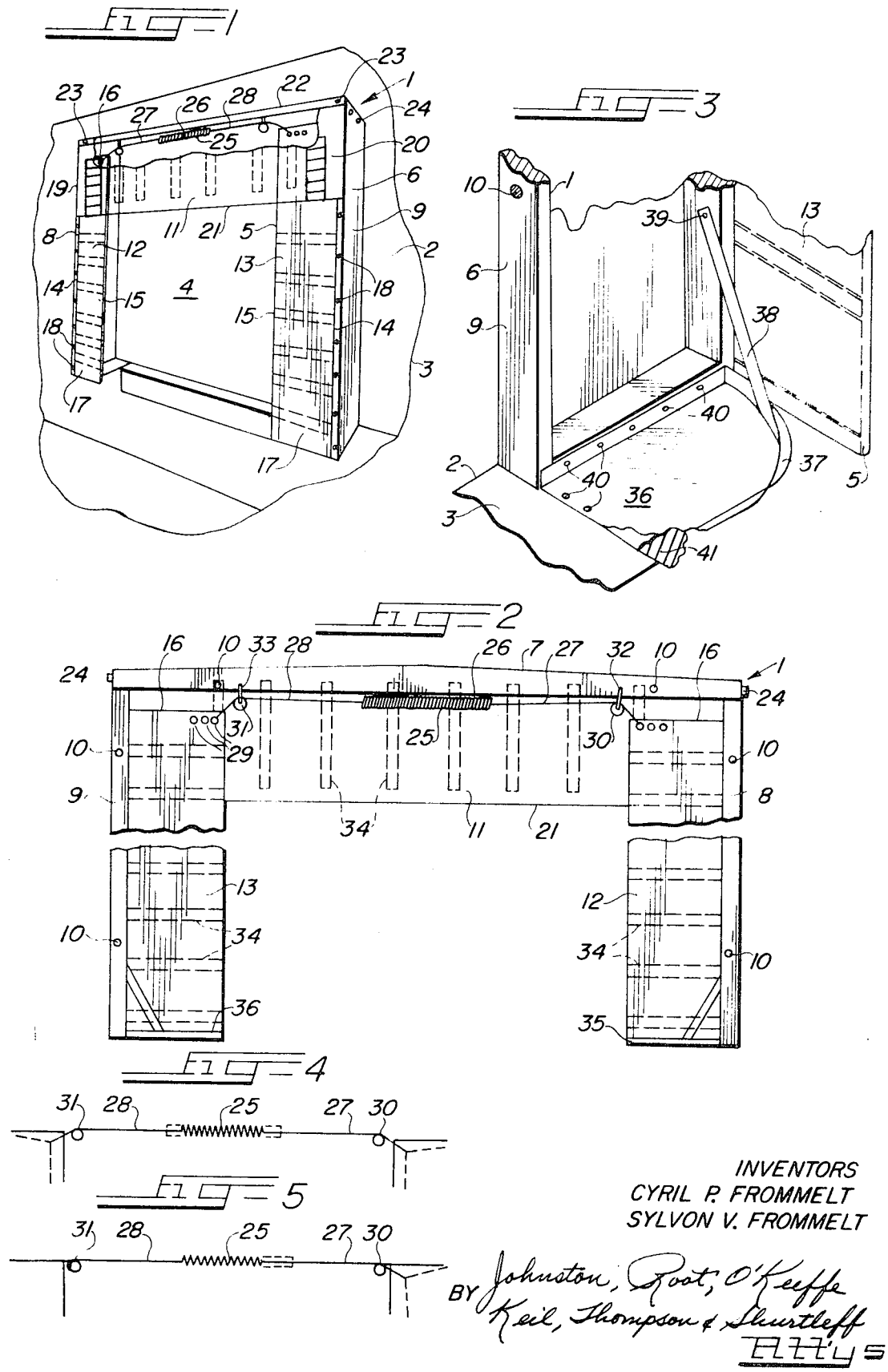

3,653,173

LOADING DOCK SHELTERS

BACKGROUND OF THE INVENTION

It is a primary object of the present invention to afford a novel loading dock shelter.

Another object is to afford a novel loading dock shelter of the type which embodies flexible side panels adapted to be supported in upright position in outwardly spaced relation to a warehouse wall, or the like.

Loading dock shelters of the retractable type, such as, for example, loading dock shelters of the type shown in our U.S. Pat. No. 2,892,463 have been heretofore known in the art. Also loading dock shelters of the type embodying a substantially rigid supporting frame, supporting a flexible head curtain and side curtains along the top and sides of a doorway in a warehouse, or the like, such as, for example, loading dock shelters of the type shown in our U.S. Pat. No. 3,403,489 also have been heretofore known in the art. Such loading dock shelters have been highly successful and afford effective shelter for men and materials during the loading and unloading of a truck, or the like, through a warehouse doorway equipped with such shelters.

Loading dock shelters of the types shown in both of our aforementioned patents may be said to be shelters which embody flexible head and side curtains around the doorway of a warehouse on which they are mounted. Both of them afford effective, automatic sealing engagement between the curtains and the trucks operatively engaged therewith, the curtains tending to drape themselves around the adjacent portions of the truck.

It is an important object of the present invention to afford a novel loading dock shelter of the type embodying flexible side curtains, wherein the side curtains are supported in a novel and expeditious manner.

In loading dock shelters heretofore known in the art, which embody flexible side curtains supported by substantially rigid supporting frames, it has commonly been the practice to secure the upper end portions of the side panels directly to the top of the frame such as by nailing, or the like, or, as taught in our aforementioned U.S. Pat. No. 3,403,489, to individually, resiliently connect the upper end portions of the side panels to the top member of the frame. Such constructions are effective to assist in supporting the side panels, and to assist in preventing the side panels from flapping in the wind, and the like.

However, in loading dock shelters wherein the upper end portions of the side curtains are directly secured to the top member of a frame in the aforementioned manner, the side curtains are quite readily subjected to tearing, particularly when the higher trucks back into the side curtains. The individual, resilient support of the inner, upper edge portions of the respective side curtains from the top member of a frame, as shown in our aforementioned U.S. Pat. No. 3,403,489, constitutes a definite improvement over the aforementioned direct connection of the upper edge portions of the side curtains to the frame, affording, at least, a yielding connection which relieves some of the stresses that are otherwise exerted on such side curtains when such a truck backs against it. It is an important object of the present invention to afford a still greater improvement in the supporting of the upper end portions of flexible side curtains in loading dock shelters.

At loading docks, as is well known in the art, trucks are often backed into loading dock shelters at an angle, or in laterally displaced position relative to the center line of the shelter. When this occurs, unequal strains are placed on the side curtains of the shelters, and the side curtains are not pressed against the adjacent portions of such a truck with equal forces. It is an object of the present invention to afford a novel loading dock shelter embodying flexible side curtains, wherein the side curtains thereof are supported in a novel and expeditious manner effective to tend to equalize the strain thereon, and to equalize the forces with which the side curtains are pressed against adjacent portions of a truck, when the truck is moved against the side curtains in any such misaligned manner.

Another object of the present invention is to afford a novel loading dock shelter embodying flexible side panels, wherein the side panels are yieldingly connected together in a novel and expeditious manner.

Yet another object is to afford a novel loading dock shelter embodying flexible side panels, wherein the side panels are yieldingly connected to the upper portion of the supporting frame therefor in a novel and expeditious manner.

A further object of the present invention is to afford a novel loading dock shelter embodying flexible side curtains which have a normal at-rest position wherein they are disposed in substantially uniplanar relation to each other and wherein the side panels are yieldingly supported in such at-rest position in a novel and expeditious manner.

Another object of the present invention is to afford a novel loading dock shelter which is practical and efficient in operation, and which may be readily and economically produced commercially.

Other and further objects of the present invention will be apparent from the following description and claims and are illustrated in the accompanying drawings which, by way of illustration, show a preferred embodiment of the present invention and the principles thereof and what we now consider to be the best mode in which we have contemplated applying these principles. Other embodiments of the invention embodying the same or equivalent principles may be used and structural changes may be made as desired by those skilled in the art without departing from the present invention and the purview of the appended claims.

DESCRIPTION OF THE DRAWINGS

In the drawings:

FIG. 1 is a fragmentary, front perspective view of a loading dock shelter embodying the principles of the present invention, showing the shelter mounted in operative position on the wall of a warehouse, or the like;

FIG. 2 is a fragmentary, rear elevational view of the loading dock shelter shown in FIG. 1;

FIG. 3 is a fragmentary, perspective view of a portion of the lower portion of the loading dock shelter shown in FIG. 1, showing the shelter mounted on the aforementioned warehouse;

FIG. 4 is a fragmentary, somewhat diagrammatic view of the upper portion of the loading dock shelter shown in FIG. 2, with certain parts disposed in different operative position; and FIG. 5 is a view similar to FIG. 4, but with parts shown in different operative position.

DESCRIPTION OF THE EMBODIMENT SHOWN HEREIN

A loading dock shelter 1 embodying the principles of the present invention is shown in the drawings to illustrate the presently preferred embodiment of the present invention. It is shown mounted on an outer wall 2 of a warehouse 3 in surrounding relation to a doorway 4 in the warehouse wall 2, FIG. 1, and is operable to afford an effective shelter between a truck and the doorway 4, when the truck is disposed in normal operative position relative to the doorway for loading and unloading operations to be effected through the rear end of the truck and the doorway 4.

The loading dock shelter 1 embodies, in general, a front cover 5 mounted on a supporting frame 6 in such position that the front cover 5 is disposed outwardly of the wall 2 of the warehouse 3 in position to be operatively engaged by a truck, when the latter is backed into operative position relative to the doorway 4.

The supporting frame 6 may be of any suitable type, such as, for example, a frame as shown in the aforementioned U.S. Pat. No. 3,403,489, and includes an elongated top wall or supporting member 7, from the respective opposite ends of which depend two elongated side walls 8 and 9.

When the supporting frame 6 is mounted in operative position on the wall 2 of the warehouse 3, the walls 7–9 preferably laterally project forwardly therefrom, with the top wall 7 preferably disposed above the doorway 4 and extending horizontally thereacross in closely adjacent relation thereto, and with the side walls 8 and 9 extending downwardly from respective ends of the top wall 7 in closely adjacent, outwardly spaced relation to respective sides of the doorway 4. The frame 6 may be secured to the wall 2 of the warehouse 3 by any suitable means such as, for example, by screws or bolts 10 extending through the rear portions of the walls 7–9 into the wall 2.

The cover 5, which is mounted on the supporting frame 6 in outwardly spaced relation to the warehouse 3, embodies a head curtain or top panel 11 and two side curtains or side panels 12 and 13, FIGS. 1 and 2. The panels 11–13 may be made of any suitable material, but preferably they are made of a water-repellant, wear-resistant material, such as, for example, canvas duck or water-impervious nylon fabric.

Each of the side curtains or side panels 11 and 12 is substantially rectangular in shape, and includes an outer longitudinally extending edge portion 14, an inner longitudinally extending edge portion 15, an upper edge portion 16 and a lower edge portion 17. The outer longitudinal edge portions 14 of the side curtains 12 and 13 are secured to the front edges of the side walls 8 and 9, respectively, by suitable means such as nails or screws 18, FIG. 1. The upper edges 16 of the side curtains 12 and 13 preferably terminate in downwardly spaced relation to the top wall 7 of the supporting frame 6, FIGS. 1 and 2.

The head curtain 11 of the cover 5 is elongated and substantially rectangular in shape, and has two substantially parallel end edges 19 and 20, a substantially straight lower edge 21 extending between the end edges 19 and 20 in substantially perpendicular relation thereto, and a top edge 22 shaped to conform to the shape of the upper edge of the top wall 7 of the frame 6, which is preferably of a rake-cut design. The upper edge portion 22 of the head curtain 11 is secured to the front edge of the top wall 7 by suitable means such as nails or screws 23. The head curtain 11 preferably is of such width that, in the assembled loading dock shelter 1, the lower edge 21 thereof extends a substantial distance below the upper edges 16 of the side curtains 12 and 13, FIG. 2.

In assembling the loading dock shelter 1, the head curtain 11 and the side curtains 12 and 13 are preferably secured in operative position to the top wall 7 and the side walls 8 and 9, respectively, of the supporting frame 6, prior to mounting the supporting frame 6 on the warehouse 3. Thereafter, the top wall 7 preferably is first secured to the wall 2 of the warehouse 3 by suitable means such as the aforementioned bolts 10, in such position that the top wall 7 of the supporting frame 6 is disposed above the doorway 4 in substantially parallel relation thereto, FIG. 1. The position of the top wall 7 relative to the doorway 4 is such that it extends beyond both side jambs thereof, and the head curtain 11 projects downwardly below the plane of the top of the doorway 4 in position to drape itself across the top of the rear end of a truck, when the truck is backed into normal operative position relative to the doorway 4 for loading and unloading operations therethrough.

After the top wall 7 and the head curtain 11 have thus been mounted in operative position on the warehouse 3, the side walls 8 and 9, and the side curtains 12 and 13 carried thereby, are next preferably secured to the top wall 7. This is preferably accomplished by securing the side walls 8 and 9 to the respective end edges of the top wall 7 by inserting suitable means such as bolts or screws 24 through the upper end portions of the side walls 8 and 9 into the respective adjacent ends of the top wall 7. The side walls 8 and 9 may then be secured to the outer face of the wall 2 of the warehouse 3 by suitable means such as the aforementioned bolts or screws 10.

When the loading dock shelter 1 is thus secured in operative position on the wall 2 of the warehouse 3, the side walls 8 and 9 of the supporting frame 6 are disposed laterally outwardly of the side jambs of the doorway 4 in such position that the side curtains 12 and 13 of the cover 5 project across the adjacent portions of the doorway 4 in such position that when a truck is disposed in the aforementioned operative position relative to the doorway 4 for loading and unloading operations, the side panels 12 and 13 engage the respective adjacent sides of the rear end of the truck in position to drape themselves thereacross.

In the assembled loading dock shelter 1, the upper edge portions of the side panels 12 and 13 of the cover 5 are connected together by a resilient connection 25, which embodies an elongated, tension coil spring 26, having two suitable, elongated connecting members such as cables 27 and 28 attached to and extending outwardly from respective ends of the spring 26. One end of each of the cables 27 and 28 is attached to a respective end of the coil spring 26, and the other ends thereof are secured in suitable openings 29 formed in the upper edge portions of the side curtains 12 and 13, respectively. The openings 29 are preferably formed in the inner end portions of the upper edge portions of the side curtains 12 and 13, and, if desired, a plurality of such openings 29 may be formed in each of the curtains 12 and 13 so that the attachment of the cables 27 and 28 thereto may be readily adjusted.

Two pulleys 30 and 31 are rotatably mounted on the front edge portion of the top wall 7 of the supporting frame 6 by suitable brackets 32 and 33, respectively. The pulleys 30 and 31 are thus mounted on the top wall 7 in such position that in the assembled loading dock shelter 1, they are disposed inwardly and above the upper edges 16 of the side curtains 12 and 13 in position to operatively support the cables 27 and 28, and, therefore, the coil spring 26, when the resilient connection 25 is operatively connected between the side curtains 12 and 13.

The resilient connection 25, preferably, is of such length that when it is operatively connected to the side curtains 12 and 13, it is placed under tension, and the coil spring 26 thereof is slightly extended when the side curtains 12 and 13 are disposed in uniplanar relation to each other. Also, preferably, the pulleys 30 and 31 are disposed in such position on the top wall 7 of the supporting frame 6 that when the resilient connection 25 is disposed in operative position between the side curtains 12 and 13, with the cables 27 and 28 trained over the pulleys 30 and 31, and with the side curtains 12 and 13 disposed in the aforementioned uniplanar relation to each other, the cables 27 and 28 extend inwardly and upwardly from the inner portions of the upper edge portions of the side curtains 12 and 13 to the pulleys 30 and 31, respectively, at an inwardly opening angle in the nature of 30° to 60°, and, preferably, of substantially 45°. With this construction, it will be seen that when the side curtains 12 and 13 are disposed in the aforementioned uniplanar relation to each other, they are yieldingly supported upwardly, and yieldingly held in inwardly extending position, by the resilient connection 25.

Each of the panels 11–13 of the cover 5 embodies a plurality of elongated stays 34 extending transversely thereacross in substantially parallel relation to each other, FIGS. 1 and 2. The stays 34 may be made of any suitable resilient material, such as, for example, spring steel and are so disposed in each of the panels 11–13 of the loading dock shelter 1 that they yieldingly urge each of the panels 11–13 to remain in their normal, at-rest position, wherein they extend across the front of the doorway, in substantially parallel relation thereto. In such position, the side curtains 12 and 13 are preferably disposed in substantially uniplanar relation to each other and the top panel 11 projects substantially vertically downwardly across the upper portion of the doorway 4, forwardly of the side panels 12 and 13.

The stays 34 may be secured to the panels 11–13 in any suitable manner, but, preferably, are disposed in pockets formed thereon in the manner disclosed in the aforementioned U.S. Pat. No. 3,403,489. The outer ends of each of the stays 34 are secured to the front faces of the respective frame members 7–9 to which the cover panels 11–13, FIG. 1, are secured. This may be accomplished in any suitable manner, but, preferably, the stays 34 are secured to the frame members 7–9 in the manner disclosed in the aforementioned U.S. Pat.

No. 3,403,489 by means of nails or screws, not shown, extending through the panels 11–13 and the respective stays 34 into the supporting frame 6.

In the preferred form of the loading dock shelter shown in the drawings, the cover 5 includes two bottom wall panels 35 and 36, FIG. 2, secured to the wall 2 of the warehouse 3 adjacent to the lower end portions 17 of the side curtains 12 and 13, respectively. The front edges of the bottom panels 35 and 36 embody upwardly projecting flanges 37, FIG. 3, having stays 38, made of similar material as the stays 34, mounted therein. The flanges 37 preferably curve rearwardly from the outer lateral edges thereof so as to insure that the side curtains 12 and 13 hang vertically in front thereof in the normal at-rest position of the latter. The stays 38 project upwardly and outwardly from the flanges on the respective bottom panels 35 and 36 and are secured at their upper ends to the front portions of the side frame members 8 and 9 by suitable means such as screws or nails 39, as shown in FIG. 3.

The outer side edges and the rear edges of the bottom panels 35 and 36 may be secured by suitable means, such as nails or screws 40, to the lower end members of the side frame members 8 and 9 and to the lower sill 41 of the doorway 4, respectively, as shown in FIG. 3. With this construction, the bottom panels 35 and 36 are firmly, but yieldingly, normally held in horizontally projecting relation rearwardly of the lower end portion 17 of the side panels 12 and 13 of the cover 5.

The rearward or inward spacing of the flanges 37 of the bottom panels 35 and 36 relative to the side panels 12 and 13 is relatively small, such as, for example, in the nature of 1 inch, so that only slight rearward movement of the curtain panels 12 and 13 is effective to close the gaps between the flanges 37 and the side panels 12 and 13. The bottom panels 35 and 36 of the cover 5 are preferably made from the same flexible fabric as the curtains 11–13. With the bottom panels 35 and 36 disposed in such operative position on the loading dock shelter 1 and the warehouse 3, the lower corners of the loading dock shelter 1 are effectively closed when a truck is disposed in normal operative position thereagainst, so as to afford efficient protection against updrafts between the side walls 8 and 9 of the supporting frame 6 and a truck disposed in the aforementioned operative engagement with the loading dock shelter 1.

With the loading dock shelter 1 constructed in this manner, the curtains 11–13 are disposed in substantially parallel relation to the wall 2 of the warehouse 3 when they are disposed in normal at-rest position. When a truck backs into operative engagement with the shelter 1, it presses the head curtain 11 and the side curtains 12 and 13 rearwardly toward the doorway 4. As illustrated somewhat diagrammatically in FIG. 4, when the truck so engages the side curtains 12 and 13 with equal force, the rearward movement of the curtains 12 and 13, through the tension exerted on the spring 26 by the cables 27–28, causes the spring 26 to extend longitudinally substantially equally, in both directions, from its normal at-rest position, as shown in solid lines in FIG. 4 to its actuated position shown in broken lines therein. On the other hand, if one of the side curtains, such as the side curtain 12, is engaged by such a truck, and the other side curtain 13 is not, the spring 26 is caused to extend longitudinally to the right, as viewed in FIG. 5, from its normal at-rest position shown in solid lines in FIG. 5 to its actuated position shown in broken lines therein.

With the upper inner edge portions of the side curtains 12 and 13 operatively connected together by the tension spring 26, and supported from the pulleys 30 and 31, in the aforementioned manner, the forces applied to the side curtains 12 and 13 by a truck engaging the loading dock shelter 1 tend to be equalized between the side curtains 12 and 13. In addition, the side curtains are effectively supported at their upper inner edge portions from the top frame member 7.

With such construction, when a truck backs into operative engagement with the shelter 1, the curtains 11–13 are draped over the rear end of the top and sides of the truck, and stays 34 and the resilient connection 25 yielding to permit such movement of the curtains 11–13. The resiliency of the stays 34 and the resilient connection 25 is effective to urge the thus rearwardly deflected curtains 11–13 forwardly toward normal position, and are effective to hold the curtains 11–13 in firm sealing engagement with the top and side walls of such a truck, so as to afford an effective, substantially weatherproof seal therebetween. Also, the stays 34 and the resilient connection 25 are effective to prevent dislodgment of the curtains 11–13 from their sealing engagement with the top and side walls of such a truck by outside force, such as, for example, the wind, and the like, or by shifting of the truck during loading and unloading operations.

In addition, the stays 34 and the resilient connection 25 are so constituted and arranged that they are effective to return the cover panels 11–13 to their normal at-rest position when such a truck moves forwardly out of such operative engagement with the loading dock shelter 1.

From the foregoing it will be seen that the present invention affords a novel loading dock shelter wherein side curtains are supported in a novel and expeditious manner.

Also, it will be seen that the present invention affords a novel loading dock shelter which affords an effective enclosure for a warehouse doorway and the rear end of a truck being loaded or unloaded through the doorway.

In addition, it will be seen that the present invention affords a novel loading dock shelter which is practical and efficient in operation, and which may be readily and economically produced commercially.

Thus, while we have illustrated and described the preferred embodiment of our invention, it is to be understood that this is capable of variation and modification, and we therefore do not wish to be limited to the precise details set forth, but desire to avail ourselves of such changes and alterations as fall within the purview of the following claims.

We claim:

A loading dock shelter comprising
a. a front cover,
b. means for supporting said cover in position to extend along the top and sides of a doorway in a warehouse wall in outwardly projecting relation to said wall,
c. said cover comprising
  1. a flexible top panel mounted on said supporting means in position to extend across the upper portion of said doorway in position to sealingly engage the top of a truck backed into operative position relative to said doorway for loading or unloading thereof, and
  2. two flexible side panels mounted on said supporting means in position to extend downwardly from said top panel along respective sides of said doorway and extend horizontally across said doorway toward the other of said side panels in position to sealingly engage the sides of said truck when the latter is disposed in said operative position, and
d. yielding means operatively connected between the upper portions of said side panels and to said supporting means for yieldingly holding said side panels in said horizontally extending position,
e. said yielding means comprising an elongated resilient member
  1. supported by said supporting means, and
  2. having its opposite ends operatively connected to said upper portions of respective ones of said side panels.

2. A loading dock shelter as defined in claim 1, and which includes
a. means mounted on said supporting means adjacent to the lower portions of said side panels in operative position to yieldingly hold said side panels in said outwardly projecting relation to said wall.

3. A loading dock shelter as defined in claim 1, and which includes
a. a plurality of flexible stays mounted in said side panels and having one end secured to said means for supporting said cover for yieldingly holding said side panels in said outwardly projecting relation to said wall.

4. A loading dock shelter comprising
a. a front cover,
b. means for supporting said cover in position to extend along the top and sides of a doorway in a warehouse wall in outwardly projecting relation to said wall,
c. said cover comprising
  1. a flexible top panel mounted on said supporting means in position to extend across the upper portion of said doorway in position to sealingly engage the top of a truck backed into operative position relative to said doorway for loading or unloading thereof, and
  2. two flexible side panels mounted on said supporting means in position to extend downwardly from said top panel along respective sides of said doorway and extend horizontally across said doorway toward the other of said side panels in position to sealingly engage the sides of said truck when the latter is disposed in said operative position,
d. yielding means operatively connected between the upper portions of said side panels and to said supporting means for yieldingly holding said side panels in said horizontally extending position,
e. said yielding means comprising
  1. an elongated tension coil spring, and
  2. cables operatively connected between respective ends of said spring and said upper portions of respective ones of said side panels, and
f. pulleys mounted on and supported by said supporting means and operatively engaged with said cables in position to support said cables and spring.

5. A loading dock shelter comprising
a. a front cover,
b. an elongated supporting member adapted to be mounted on a wall of a warehouse in position to
  1. extend longitudinally along the top of a doorway in said wall, and
  2. project laterally forwardly from said wall,
c. said cover comprising
  1. a flexible top panel mounted on the front edge portion of said member in position to extend along the top of said doorway and project downwardly across the upper portion of said doorway in position to engage the top of a rear of a truck backed into operative position relative to said doorway for loading and unloading said truck through said doorway, and
  2. two flexible side panels disposed in substantially parallel relation to said top panel in position to extend along respective sides of said doorway and project horizontally thereacross toward each other in position to engage the sides of the rear of said truck when said truck is disposed in said position,
d. said side panels having
  1. outer longitudinal edge portions operatively connected to said member,
  2. inner longitudinal edge portions,
  3. a normal at-rest position, when they are not so engaged by such a truck, wherein they are disposed in substantially uniplanar relation to each other, and
  4. an actuated position, when so engaged by such a truck, wherein said inner longitudinal edge portions project inwardly toward said doorway,
e. resilient means operatively connected to and between the upper portions of said inner longitudinal edge portions in position to yieldingly hold said side panels in said normal at-rest position, and
f. means supported by said supporting member and engaging said resilient means in position to support said resilient means for movement of the latter longitudinally of said supporting member.

6. A loading dock shelter as defined in claim 5, and in which
a. said resilient means comprises
  1. an elongated tension coil spring, and
  2. two cables connected
    a'. to respective ends of said spring, and
    b'. to said upper portion of said inner longitudinal edge portion of respective ones of said side panels.

7. A loading dock shelter as defined in claim 6, and which includes
a. flexible bottom panels disposed between said warehouse wall and the bottom edge portions of respective ones of said side panels, and
b. resilient means mounted in said bottom panels in position to hold said bottom panels in outwardly projecting relation to said warehouse wall in position to engage said respective bottom edge portions of said side panels and yieldingly hold the bottom portions of said side panels in said normal at-rest position.

* * * * *